US010528057B2

(12) United States Patent
Branson (10) Patent No.: US 10,528,057 B2
(45) Date of Patent: Jan. 7, 2020

(54) SYSTEMS AND METHODS FOR RADAR LOCALIZATION IN AUTONOMOUS VEHICLES (71) Applicant: GM GLOBAL TECHNOLOGY OPERATIONS LLC, Detroit, MI (US)

(72) Inventor: Elliot Branson, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 156 days.

(21) Appl. No.: 15/714,750

(22) Filed: Sep. 25, 2017

(65) Prior Publication Data
US 2018/0024569 A1 Jan. 25, 2018

(51) Int. Cl.
G05D 1/02 (2006.01)
G05D 1/00 (2006.01)
G01S 13/86 (2006.01)
G08G 1/16 (2006.01)
G01S 17/93 (2006.01)
G01S 13/06 (2006.01)
G01S 13/93 (2006.01)

(52) U.S. Cl.
CPC ............ G05D 1/0257 (2013.01); G01S 13/06 (2013.01); G01S 13/865 (2013.01); G01S 13/867 (2013.01); G01S 13/931 (2013.01); G01S 17/936 (2013.01); G05D 1/0088 (2013.01); G08G 1/166 (2013.01); G01S 2013/9342 (2013.01); G05D 2201/0213 (2013.01)

(58) Field of Classification Search
None
See application file for complete search history.

(56) References Cited

U.S. PATENT DOCUMENTS 9,037,403 B2 * 5/2015 Delp .................... G05D 1/0212 701/445
2003/0210175 A1 * 11/2003 Bickert ................. G01S 7/2927 342/93
2011/0287778 A1 * 11/2011 Levin .................... G01S 5/0252 455/456.1

(Continued)

OTHER PUBLICATIONS

Ward, Erik and Folkesson, John, Vehicle Localization with low Cost Radar Sensors, IEEE Intelligent Vehicles Symposium (Year: 2016).*

Primary Examiner — Ryan Rink
(74) Attorney, Agent, or Firm — Lorenz & Kopf, LLP (57) ABSTRACT Systems and method are provided for controlling a vehicle. In one embodiment, a localization method includes receiving sensor data relating to an environment of a vehicle, the sensor data including a plurality of sensor returns associated with objects in the environment, each of the sensor returns having a plurality of corresponding attributes, and constructing a first plurality of sensor data groups, each including a self-consistent subset of the plurality of sensor returns based on their corresponding attributes. The method further includes defining, for each of the first plurality of sensor data groups, a first set of features, wherein each feature is based on at least one of the corresponding attributes and each has an associated feature location, and determining, with a processor, a feature correlation between the first set of features and a second, previously determined set of features.

17 Claims, 9 Drawing Sheets (56) References Cited

U.S. PATENT DOCUMENTS

| | | | |
|---|---|---|---|
| 2014/0207282 A1* | 7/2014 | Angle | G05B 15/02 |
| | | | 700/257 |
| 2014/0240167 A1* | 8/2014 | Cho | G01S 13/92 |
| | | | 342/104 |
| 2016/0238703 A1* | 8/2016 | Liu | G01S 13/867 |
| 2017/0115396 A1* | 4/2017 | Uehara | G01S 17/936 |
| 2017/0205501 A1* | 7/2017 | Liu | G01S 7/414 |
| 2017/0299711 A1* | 10/2017 | Kishigami | G01S 13/284 |
| 2017/0356991 A1* | 12/2017 | Yosoku | G01S 13/589 |
| 2017/0371033 A1* | 12/2017 | Hamada | G01S 13/58 |
| 2018/0045519 A1* | 2/2018 | Ghadiok | G06F 16/5866 |
| 2018/0143320 A1* | 5/2018 | Steever | G01S 17/026 |
| 2019/0011558 A1* | 1/2019 | Crouch | G01S 17/102 |
| 2019/0094877 A1* | 3/2019 | Smith | B60W 10/04 |

* cited by examiner

SYSTEMS AND METHODS FOR RADAR LOCALIZATION IN AUTONOMOUS VEHICLES

TECHNICAL FIELD

The present disclosure generally relates to autonomous vehicles, and more particularly relates to systems and methods for determining the position of an autonomous vehicle relative to its environment.

BACKGROUND

An autonomous vehicle is a vehicle that is capable of sensing its environment and navigating with little or no user input. It does so by using sensing devices such as radar, lidar, image sensors, and the like. Autonomous vehicles further use information from global positioning systems (GPS) technology, navigation systems, vehicle-to-vehicle communication, vehicle-to-infrastructure technology, and/or drive-by-wire systems to navigate the vehicle.

While recent years have seen significant advancements in autonomous vehicles, such vehicles might still be improved in a number of respects. For example, localization—i.e., the determination of the geographical position of a vehicle—is often accomplished via a combination of global positioning system (GPS) data and direct observation of structures and objects in the vicinity of the vehicle via optical, radar, and lidar sensor data. Such localization may be challenging in some contexts, such as in weather conditions that reduce the effectiveness of the sensors used for localization.

Accordingly, it is desirable to provide systems and methods for localization in autonomous vehicles. Furthermore, other desirable features and characteristics of the present invention will become apparent from the subsequent detailed description and the appended claims, taken in conjunction with the accompanying drawings and the foregoing technical field and background.

SUMMARY

Systems and method are provided for controlling a first vehicle. In one embodiment, a localization method includes receiving sensor data relating to an environment of a vehicle, the sensor data including a plurality of sensor returns associated with objects in the environment, each of the sensor returns having a plurality of corresponding attributes, and constructing a first plurality of sensor data groups, each including a self-consistent subset of the plurality of sensor returns based on their corresponding attributes. The method further includes defining, for each of the first plurality of sensor data groups, a first set of features, wherein each feature is based on at least one of the corresponding attributes and each has an associated feature location, and determining, with a processor, a feature correlation between the first set of features and a second, previously determined set of features.

In one embodiment, the plurality of corresponding attributes includes at least one of Doppler shift, return power, and neighborhood similarity.

In one embodiment, the sensor data is includes radar data.

In one embodiment, the first set of features includes a histogram of one of the corresponding attributes.

In one embodiment, the first set of features is a convex hull of the histogram.

In one embodiment, the first set of features includes a summary statistic of one of the corresponding attributes.

In one embodiment, determining the feature correlation includes performing an outlier removal procedure with respect to the first and second sets of features.

In one embodiment, the outlier removal procedure is a random sample consensus (RANSAC) procedure.

In one embodiment, each of the sensor data groups is classified as being associated with one of a dynamic object, a static-moveable object, or a static-nonmoveable object, and determining the feature correlation based only on the sensor data groups associated with static-nonmoveable objects.

A system for controlling a vehicle in accordance with one embodiment includes a feature determination module and a feature correlation module. The feature determination module, which includes a processor, is configured to: receive sensor data relating to an environment of a vehicle, the sensor data including a plurality of sensor returns associated with objects in the environment, each of the sensor returns having a plurality of corresponding attributes; construct a first plurality of sensor data groups, each including a self-consistent subset of the plurality of sensor returns based on their corresponding attributes; and define, for each of the first plurality of sensor data groups, a first set of features, wherein each feature is based on at least one of the corresponding attributes and each has an associated feature location. The feature correlation module is configured to determine, with a processor, a feature correlation between the first set of features and a second, previously determined set of features.

In one embodiment, the plurality of corresponding attributes includes at least one of Doppler shift, return power, and neighborhood similarity; and the sensor data is at least one of radar data and lidar data.

In one embodiment, the first set of features includes a histogram of one of the corresponding attributes.

In one embodiment, the first set of features includes a summary statistic of one of the corresponding attributes.

In one embodiment, the feature correlation module performs an outlier removal procedure with respect to the first and second sets of features.

In one embodiment, the outlier removal procedure is a random sample consensus (RANSAC) procedure.

In one embodiment, the feature determination module classifies each of the sensor data groups as being associated with one of a dynamic object, a static-moveable object, or a static-nonmoveable object, and the feature correlation module determines the feature correlation based only on the sensor data groups associated with static-nonmoveable objects.

An autonomous vehicle in accordance with one embodiment includes at least one sensor that provides sensor data relating to an environment of the autonomous vehicle, the sensor data including a plurality of sensor returns associated with objects in the environment, each of the sensor returns having a plurality of corresponding attributes. The autonomous vehicle further includes a controller that, by a processor: receives the sensor data; constructs a first plurality of sensor data groups, each including a self-consistent subset of the plurality of sensor returns based on their corresponding attributes; defines, for each of the first plurality of sensor data groups, a first set of features, wherein each feature is based on at least one of the corresponding attributes and each has an associated feature location; determines, with a processor, a feature correlation between the first set of features and a second, previously determined set of features; and estimates a position of the vehicle based on the feature correlation.

In one embodiment, the controller performs outlier removal via a random sample consensus (RANSAC) procedure to determine the feature correlation.

In one embodiment, the plurality of corresponding attributes includes at least one of Doppler shift, return power, and neighborhood similarity; and the sensor data is at least one of radar data and lidar data.

In one embodiment, the first set of features includes at least one of a histogram or a summary statistic of one of the corresponding attributes.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
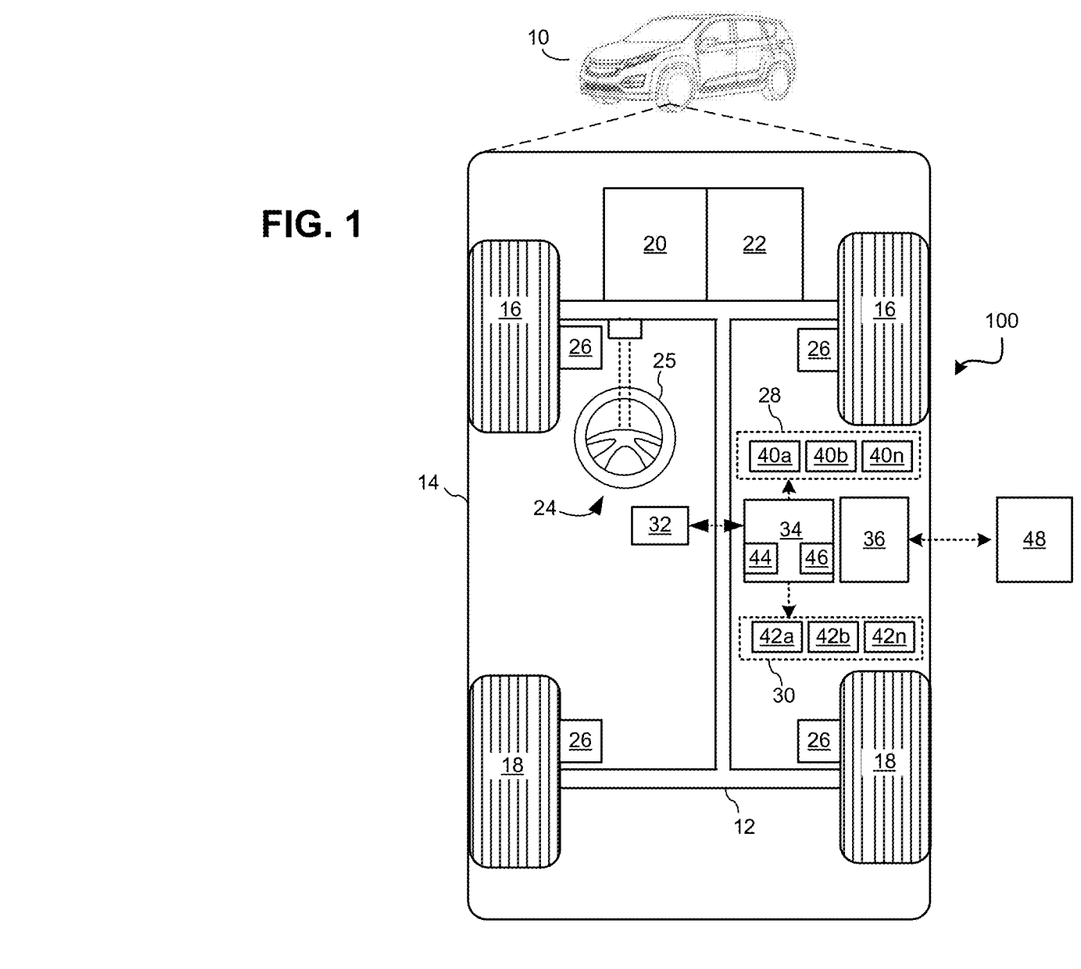
FIG. 1 is a functional block diagram illustrating an autonomous vehicle including a localization system, in accordance with various embodiments.

With reference to FIG. 1, a localization system shown generally as 100 is associated with a vehicle 10 in accordance with various embodiments. In general, localization system (or simply "system") 100 allows for a localization method in which sensor data groups are constructed using self-consistent subsets of sensor returns based on their corresponding attributes (such as return power, Doppler shift, neighborhood similarity, and the like). Features are defined for the corresponding attributes and each has an associated feature location, and determining, with a processor, a feature correlation between the first set of features and a second, previously determined set of features.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the localization system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, etc., can also be used.

In an exemplary embodiment, the autonomous vehicle 10 corresponds to a level four or level five automation system under the Society of Automotive Engineers (SAE) "J3016" standard taxonomy of automated driving levels. Using this terminology, a level four system indicates "high automation," referring to a driving mode in which the automated driving system performs all aspects of the dynamic driving task, even if a human driver does not respond appropriately to a request to intervene. A level five system, on the other hand, indicates "full automation," referring to a driving mode in which the automated driving system performs all aspects of the dynamic driving task under all roadway and environmental conditions that can be managed by a human driver. It will be appreciated, however, the embodiments in accordance with the present subject matter are not limited to any particular taxonomy or rubric of automation categories. Furthermore, systems in accordance with the present embodiment may be used in conjunction with any vehicle in which the present subject matter may be implemented, regardless of its level of autonomy.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10 (such as the state of one or more occupants). Sensing devices 40a-40n might include, but are not limited to, radars (e.g., long-range, medium-range-short range), lidars, global positioning systems, optical cameras (e.g., forward facing, 360-degree, rear-facing, side-facing, stereo, etc.), thermal (e.g., infrared) cameras, ultrasonic sensors, odometry sensors (e.g., encoders), an inertial measurement unit (IMU) (IMUS) and/or other sensors that might be utilized in connection with systems and methods in accordance with the present subject matter.

The actuator system 30 includes one or more actuator devices 42a-42n that control one or more vehicle features such as, but not limited to, the propulsion system 20, the transmission system 22, the steering system 24, and the brake system 26. In various embodiments, autonomous vehicle 10 may also include interior and/or exterior vehicle features not illustrated in FIG. 1, such as various doors, a trunk, and cabin features such as air, music, lighting, touch-screen display components (such as those used in connection with navigation systems), and the like.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. Route information may also be stored within data storage device 32—i.e., a set of road segments (associated geographically with one or more of the defined maps) that together define a route that the user may take to travel from a start location (e.g., the user's current location) to a target location. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an application specific integrated circuit (ASIC) (e.g., an ASIC tailored to implement a neural network), a field programmable gate array (FPGA), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10. In various embodiments, controller 34 is configured to implement the localization system 100 as discussed in detail below.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals that are transmitted to the actuator system 30 to automatically control the components of the autonomous vehicle 10 based on the logic, calculations, methods, and/or algorithms. Although only one controller 34 is shown in FIG. 1, embodiments of the autonomous vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

Figure 2:
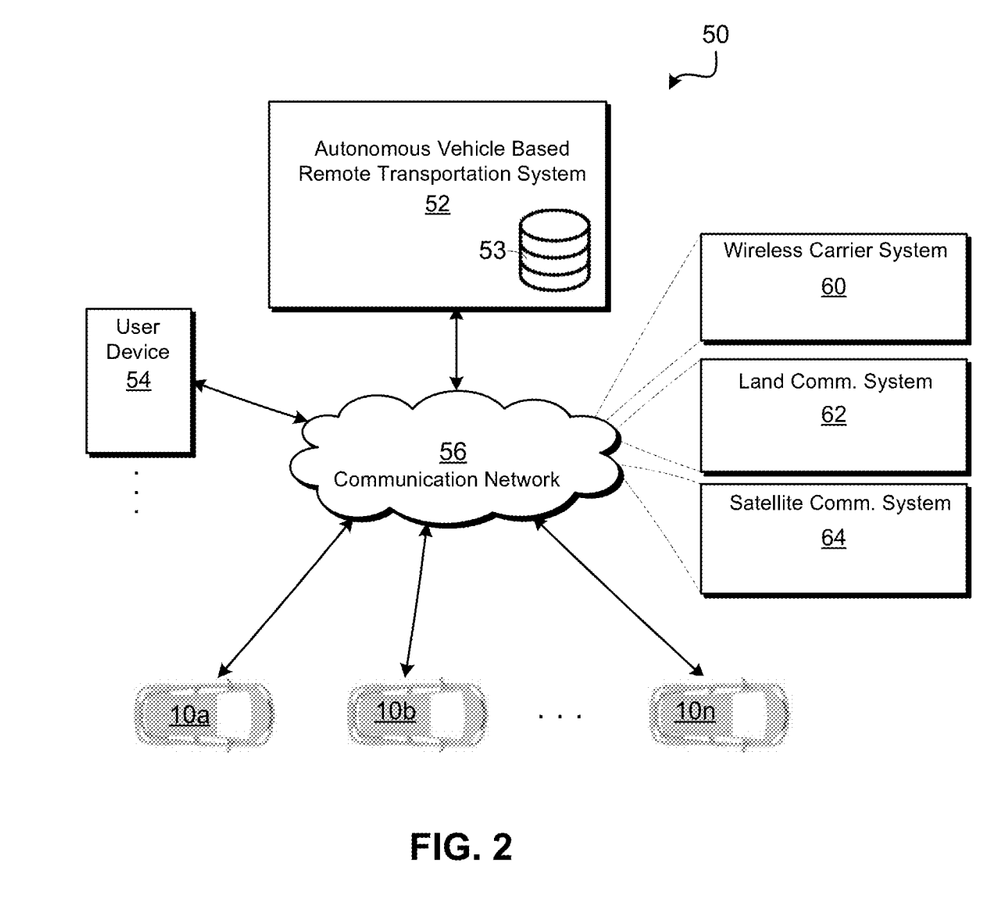
FIG. 2 is a functional block diagram illustrating a transportation system having one or more autonomous vehicles as shown in FIG. 1, in accordance with various embodiments.

The communication system 36 is configured to wirelessly communicate information to and from other entities 48, such as but not limited to, other vehicles ("V2V" communication), infrastructure ("V2I" communication), networks ("V2N" communication), pedestrian ("V2P" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC)

channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous-vehicle-based remote transportation system. FIG. 2 illustrates an exemplary embodiment of an operating environment shown generally at 50 that includes an autonomous-vehicle-based remote transportation system (or simply "remote transportation system") 52 that is associated with one or more autonomous vehicles 10a-10n as described with regard to FIG. 1. In various embodiments, the operating environment 50 (all or a part of which may correspond to entities 48 shown in FIG. 1) further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 may include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a component of a home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, not shown), which may be cloud-based, network-based, or resident at the particular campus or geographical location serviced by the remote transportation system 52. The remote transportation system 52 can be manned by a live advisor, an automated advisor, an artificial intelligence system, or a combination thereof. The remote transportation system 52 can communicate with the user devices 54 and the autonomous vehicles 10a-10n to schedule rides, dispatch autonomous vehicles 10a-10n, and the like. In various embodiments, the remote transportation system 52 stores store account information such as subscriber authentication information, vehicle identifiers, profile records, biometric data, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
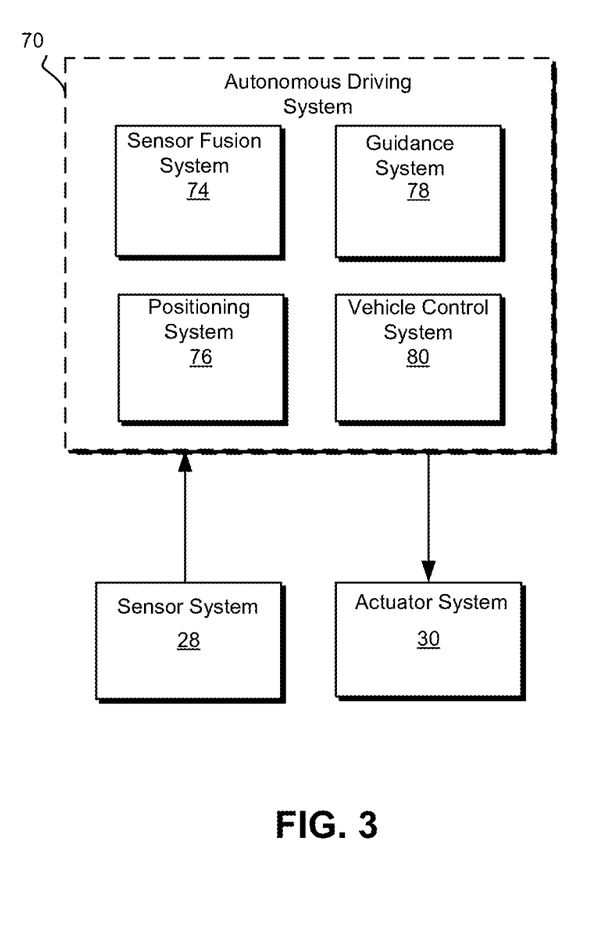
FIG. 3 is functional block diagram illustrating an autonomous driving system (ADS) associated with an autonomous vehicle, in accordance with various embodiments.

In accordance with various embodiments, controller 34 implements an autonomous driving system (ADS) 70 as shown in FIG. 3. That is, suitable software and/or hardware components of controller 34 (e.g., processor 44 and computer-readable storage device 46) are utilized to provide an autonomous driving system 70 that is used in conjunction with vehicle 10.

In various embodiments, the instructions of the autonomous driving system 70 may be organized by function or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors (e.g., sensor system 28), including but not limited to cameras, lidars, radars, and/or any number of other types of sensors.

The positioning system 76 processes sensor data along with other data to "localize" or otherwise determine a position (e.g., a local position relative to a map, an exact position relative to a lane of a road, a vehicle heading, etc.) of the vehicle 10 relative to the environment as further discussed below. As can be appreciated, a variety of techniques may be employed to accomplish localization, including, for example, simultaneous localization and mapping (SLAM), particle filters, Kalman filters, Bayesian filters, and the like.

The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

Figure 4:
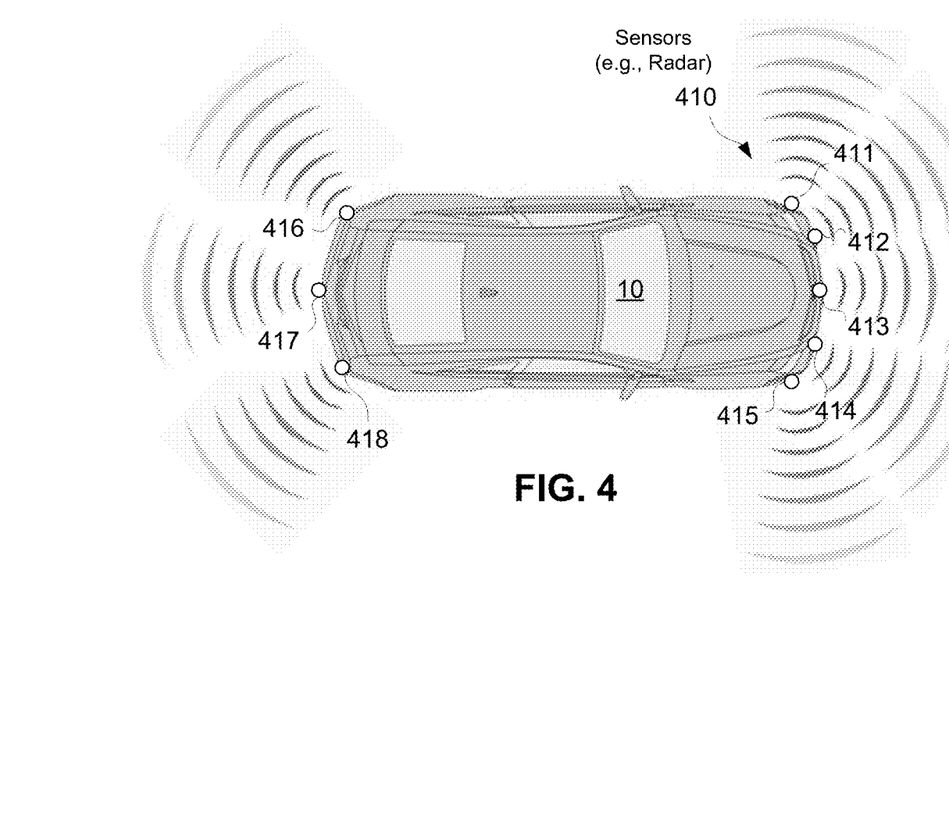
FIG. 4 is a conceptual top-down view of an example sensor configuration for an autonomous vehicle in accordance with various embodiments.

As a preliminary matter, the embodiments disclosed herein may be implemented using a variety of sensor types included within sensor system 28. Referring momentarily to FIG. 4, for example, AV 10 may include a number of direction sensors 410 distributed around the perimeter of AV 10 (e.g., a front group of sensors 411-415 and a rear group of sensors 416-418), each having a corresponding field of view as shown, and each configured to generate sensor data of some type. In a particular embodiment, sensors 410 correspond to radar sensors of the type that are particularly efficacious in poor weather conditions (e.g., during rain and snow storms), and which receive "returns" (or "sensor returns") corresponding to return radar signals characterized by a position in space (relative to AV 10). These sensor returns, as discussed in further detail below, can also be characterized by their corresponding attributes, such as return power, neighborhood similarity, Doppler shift, and the like. While radar sensor returns and attributes are discussed below in conjunction with various examples, the range of embodiments is not so limited.

As mentioned briefly above, the localization system 100 of FIG. 1 is configured to construct sets of "features" derived from self-consistent groups of sensor returns (e.g., radar returns) and subsequently track the location of those features during subsequent time steps.

Figure 5:
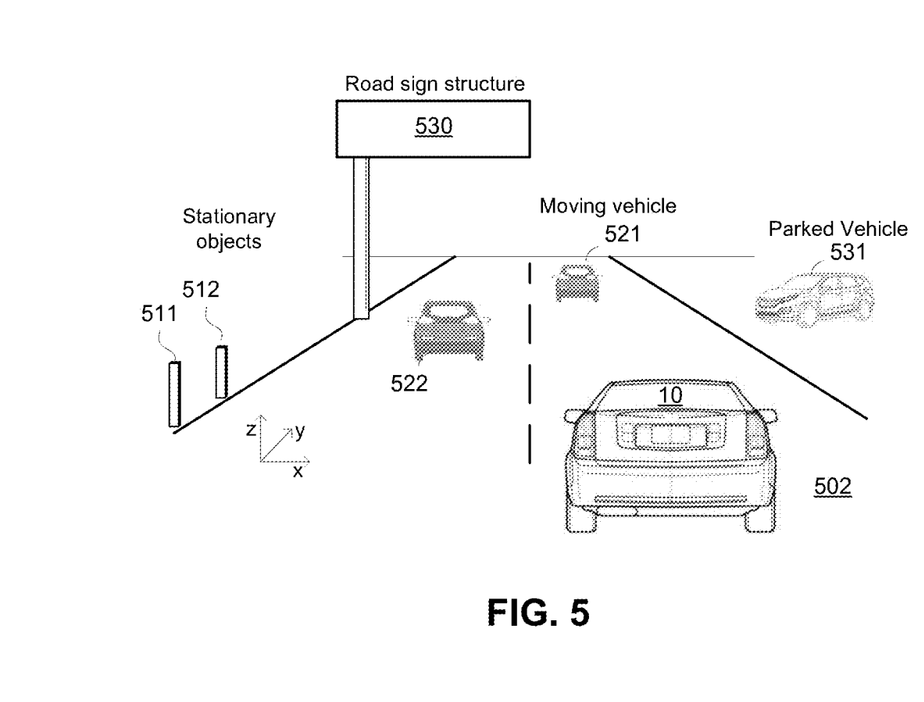
FIG. 5 illustrates an autonomous vehicle traveling along an example roadway in accordance with an example embodiment.
Figure 6:
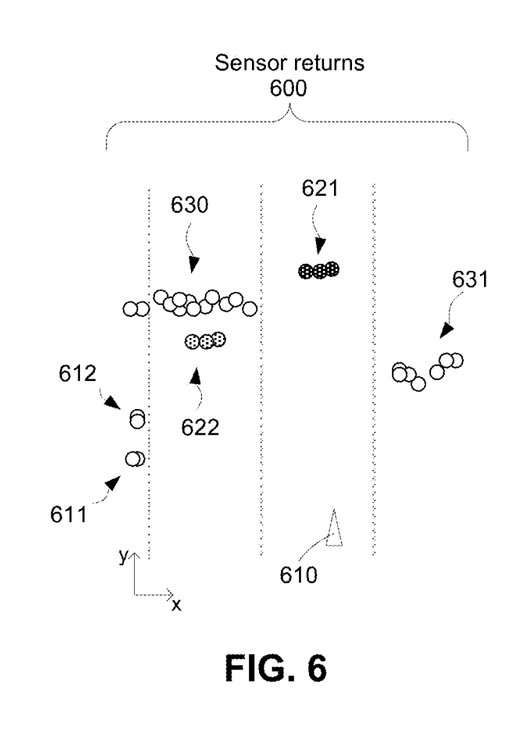
FIG. 6 is a top view of exemplary sensor returns associated with the scenario of FIG. 5.

By way of illustration, FIG. 5 depicts, in perspective view, an AV 10 traveling along a roadway 502 toward a number of objects in the environment, namely, a road sign structure 530, stationary poles 511 and 512, a parked vehicle 531, and moving vehicles (moving in the same direction as AV 10) 521 and 522. FIG. 6 illustrates the corresponding sensor data in the form of sensor returns 600 that might be received by AV 10 (corresponding to icon 610 in FIG. 6). It will be appreciated that while sensor returns 600 are conceptually illustrated as points existing at the surfaces of objects that are scanned by the corresponding sensors, such sensor returns actually correspond to sensor data received at AV 10, and which include information regarding the position of the returns (e.g., distance from AV 10) as well as various attributes of the return signal as determined by sensor system 28.

With continued reference to FIG. 6 in conjunction with FIG. 5, sensor returns 621 correspond to returns from the back of moving vehicle 521, sensor returns 631 correspond to returns from parked vehicle 531, sensor returns 630 correspond to returns from road sign structure 530, sensor returns 622 correspond to returns from the back of moving vehicle 522, and sensor returns 611 and 612 correspond to stationary objects 511 and 512, respectively.

In addition to the spatial position of each sensor return 600, AV 10 will also have access (via sensor system 28) to a set of attribute values for each return, which will typically vary depending upon the nature of the returns and sensor type used to generate the sensor data. In one embodiment, for example, sensor returns 600 are radar sensor returns characterized by the attributes of return power, Doppler shift (indicative of the relative velocity of the object relative to AV 10), and neighborhood similarity (e.g., how similar each return is to its nearest neighbor(s)). For example, returns 600 in FIG. 6 are illustrated using different levels of shading corresponding to different values of Doppler shift. Thus, moving vehicle 521 and 522 produce returns 621 and 622 that are different from returns 611, 612, 630, and 631 of stationary objects 511, 512, 530, and 531.

Accordingly, one or more "sensor data groups" may be constructed based on self-consistent attributes of sensor returns 600. Considering the attribute of Doppler shift, for example, sensor returns 621 in FIG. 6 may be members of one sensor data group, sensor returns 630 may be members of another sensor data group, and so on. As used herein, the phrase "self-consistent" with respect to sensor return attributes refers to some predetermined level of similarity. For example, the sensor data groups may be determined based on a machine learning clustering procedure.

Figure 7:
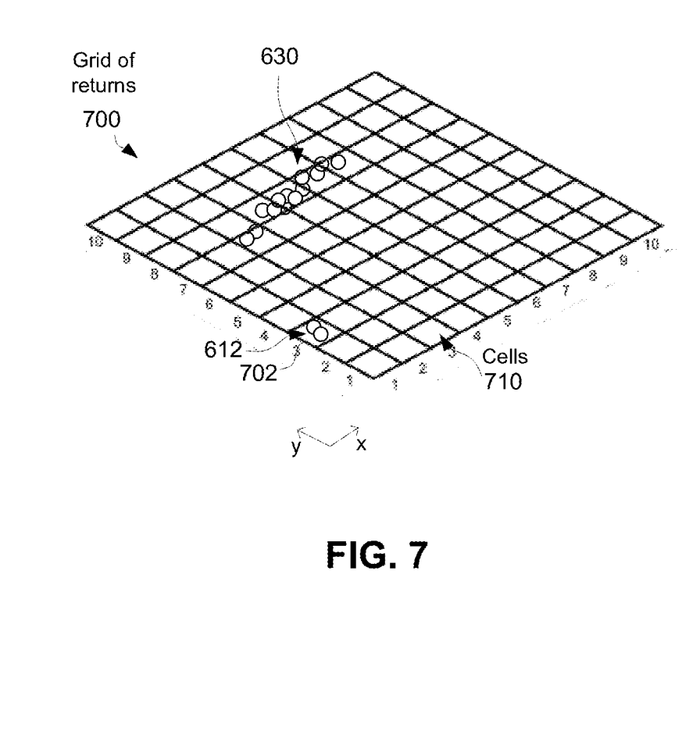
FIGS. 7 and 8 depict selected sensor returns of FIG. 6 partitioned into various grid configurations.

In various embodiments, returns 600 are partitioned into a geometric "grid" to facilitate processing of the sensor data as described further below. Referring to FIG. 7, for example, a square grid 700 may defined with any convenient side length (e.g., 1.0 m) to partition the sensor returns (in this illustration, returns 630 and 612) into a matrix of cells 710. For example, returns 612 are depicted as being members of a cell 702, while returns 630 are shown as spanning multiple cells 710.

Figure 8:
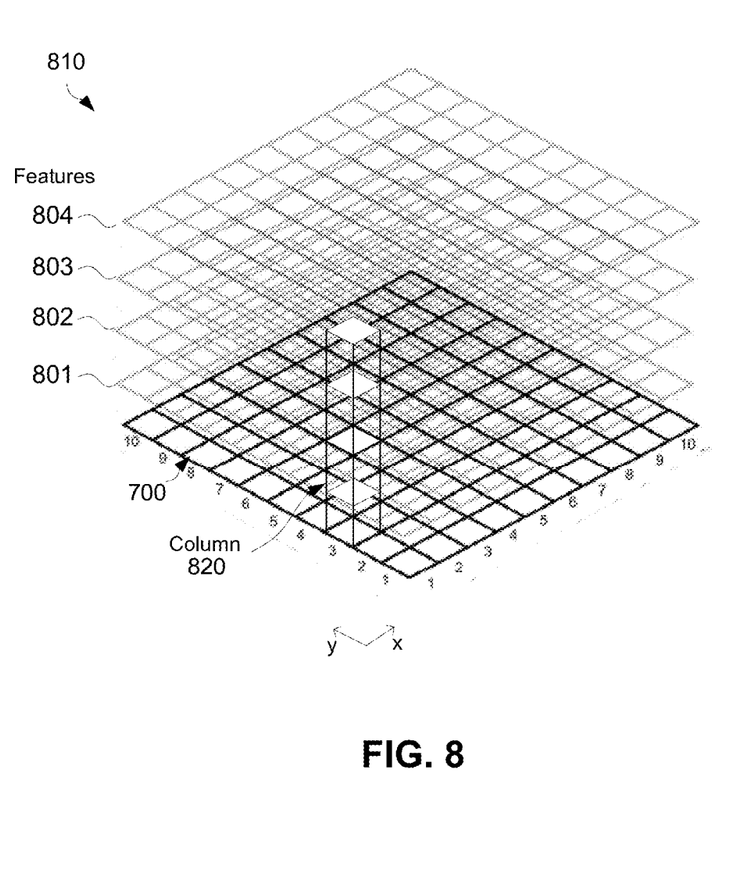

As further illustrated in FIG. 8, the sensor returns within individual cells of grid 700 may be processed to define "features" of those sensor returns. These features may be visualized as individual planes (e.g., planes 801-804) parallel to grid 700, each plane corresponding to a separate feature. Thus a vector of features for a given cell may be visualized as a column, such as column 820 of FIG. 8.

As used herein, the term "feature" with respect to the attributes of a subset of sensor returns refers to some mathematical function applied to those attributes to derive a simplified value that characterizes that subset of features in some way. Depending upon the embodiment, any number of features may be determined, and each feature may be a function of one or more of the corresponding attributes.

In some embodiments, the features include one or more summary statistics, such as mean, standard deviation, skewness, range, and the like. For example, in the case of radar sensor returns, these features might include mean return power, Doppler shift range, mean similarity, or the like. In other embodiments, the feature is a histogram of an attribute, such as a histogram of Doppler shift, a histogram of return power, a histogram of return similarity, etc. In some embodiments, the histogram is normalized—e.g., to contain frequencies within the range (0.0, 1.0). In some embodiments, a histogram feature may be characterized by the vertices of its convex hull (i.e., the convex polygon forming a convex hull bounding the histogram).

Regardless of the number and type of features defined for each of the sensor data groups (which in some embodiments is further partitioned into individual grid cells 700), localization system 100 is configured, as described in further detail below, to correlate these features at successive time steps as AV 10 travels along roadway 502, thereby providing information that can be used (e.g., by positioning system 76 of FIG. 3) to determine the location of AV 10.

Figure 9:
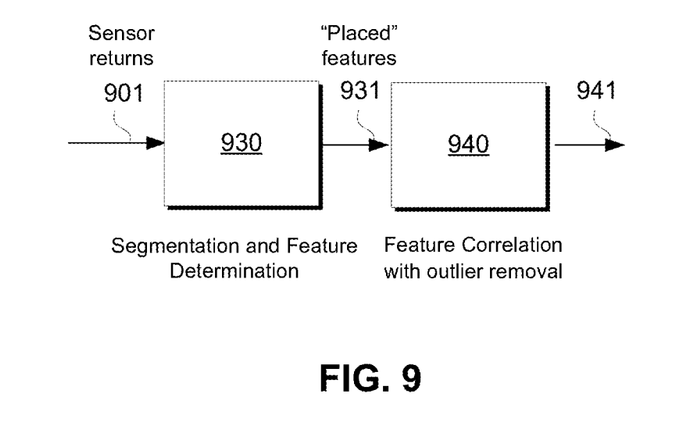
FIG. 9 is a dataflow diagram illustrating a localization system of an autonomous vehicle, in accordance with various embodiments.

Referring to FIG. 9, an exemplary localization system generally includes a feature determination module 930 and a feature correlation module 940. Feature determination module is generally configured to receive sensor data 901, which in various embodiments includes sensor returns (such as radar and/or lidar sensor returns) associated with objects in the environment (as shown in FIGS. 5 and 6). Feature determination module 930 is further configured to construct a sensor data groups (such as groups 630 and 621 in FIG. 6), each including a self-consistent subset of the plurality of sensor returns based on their corresponding attributes. Feature determination module 930 then defines, for each of the sensor data groups, a set of features based on attributes of the sensor returns.

The output 931 of feature determination module 930 is thus a set of "placed" features—i.e., features that have a corresponding geometric location in the environment relative to AV 10. This geometric location may correspond, for example, to the location of the grid cell containing those features (as shown in FIG. 8). In other embodiments, the geometric location of the feature is some function of the positions of the sensor returns in the corresponding sensor data group (e.g., center of mass of the sensor returns, or the like).

Feature correlation module 940 is configured to receive placed features 931 and determine a feature correlation between those placed features and a previously determined set of placed features. That is, at each time step (which may range, for example, from 0.1 s to 1.0 s), feature correlation module attempts to find the best mapping (e.g., homography) of outputs 931. Stated another way, module 940 tries to find a one-to-one correspondence between placed features over sequential time steps to estimate the distance and direction traveled by AV 10 during that time step.

Figure 11:
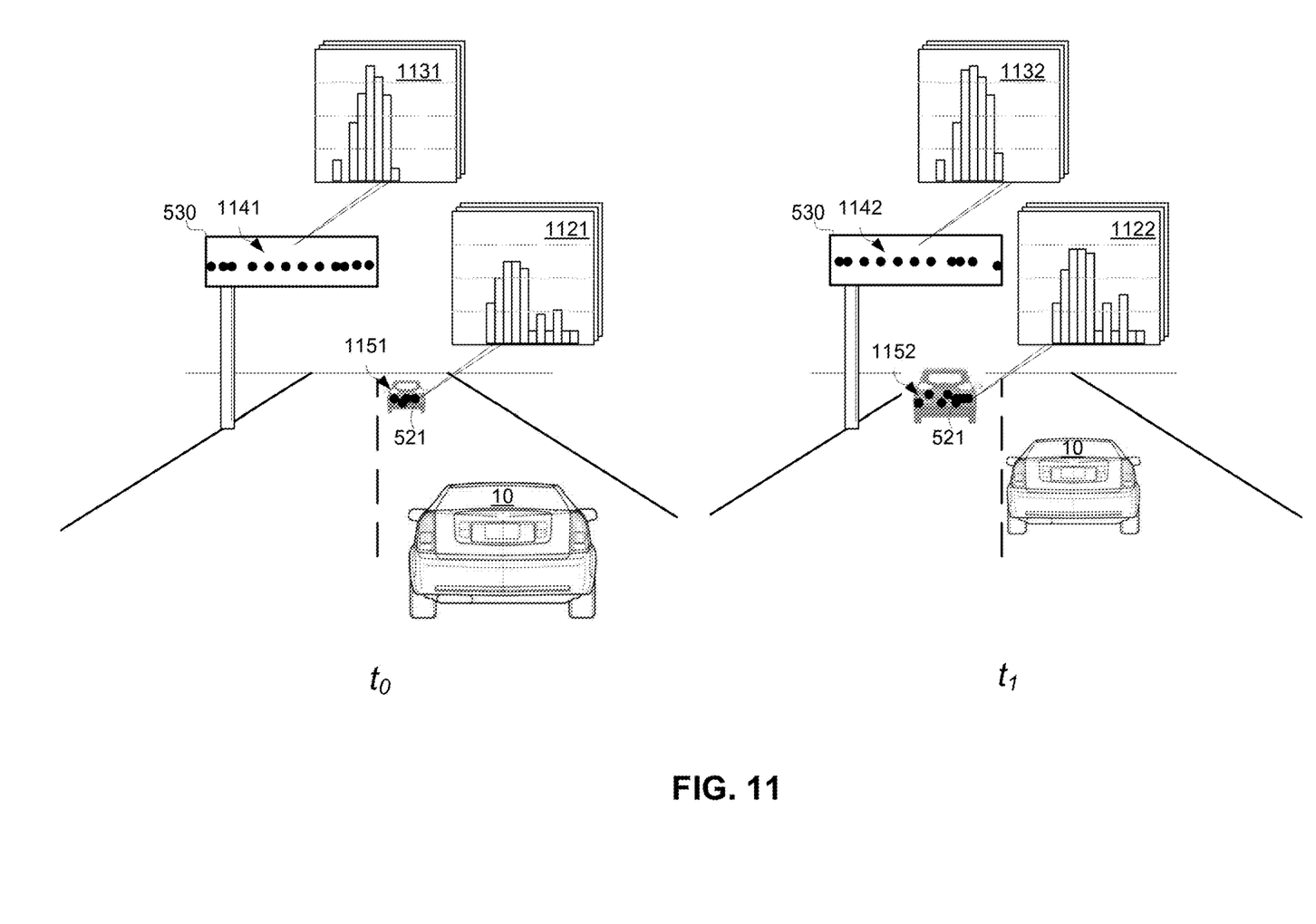
FIG. 11 illustrates exemplary sensor returns acquired by an autonomous vehicle traveling along an example roadway in accordance with various embodiments.

Consider, for example, the example shown in FIG. 11, which depicts AV 10 traveling along a roadway at two times: $t_0$ (left) and $t_1$ (right). AV 10 is approaching two objects: road sign structure 530, and moving vehicle 521. At $t_0$, AV 10 observes sensor data group 1141 and sensor data group 1121. As described above, these sensor data groups may be constructed based on the similarity of their mean power returns, depicted in FIG. 11 as respective histogram features 1131 and 1122.

At $t_1$, AV 10 has progressed some distance along its lane, bringing it closer to road sign structure 530 as well as moving vehicle 521, which has changed lanes as shown. At this point, AV 10 observes sensor data group 1142 (having a corresponding histogram feature 1132), and sensor data group 1152 (having a corresponding histogram feature 1122). While the positions and shapes of histogram features 1122 and 1132 are not identical to corresponding histogram features 1122 and 1131, they are sufficiently similar that feature correlation module 940 can infer (through a suitable feature correlation procedure) that they correspond to the same objects (i.e., 521 and 530, respectively). The output 941 of feature correlation module 940 may then be provided to positioning system 76 of FIG. 3 to further assist in localization of AV 10.

Figure 10:
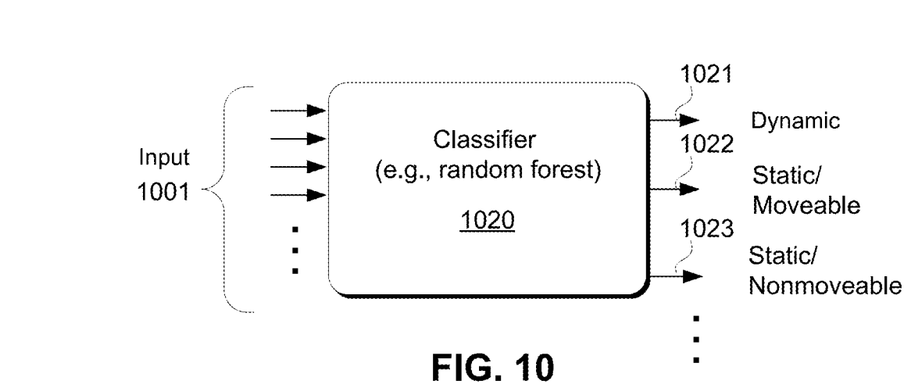
FIG. 10 is a dataflow diagram illustrating a classifier in accordance with various embodiments.

In this regard, it will be understood that stationary objects might provide the best measure of travel distance between time steps. In that regard, in some embodiments, feature correlation module (or feature determination module 930) first removes from consideration sensor data groups corresponding to what might be classified as moving objects. For example, referring to FIG. 10, a machine learning classifier 1020 (such as a random forest classifier) may be trained to receive an input 1001 corresponding to the attributes of a particular set of sensor returns, and produce a classification output including a vector of likelihoods that the sensor returns were received from a dynamic (1021), static-moveable (1022), or static-nonmoveable (1023) object. With reference to FIG. 5, for example, objects 511, 512, and 530 might be classified as static-nonmoveable objects, vehicles 521 and 522 might be classified as dynamic objects, and parked vehicle 531 might be classified as a static-moveable object.

Module 940 may further refine its correlation by employing an outlier detection technique. In accordance with various embodiments, a random sample consensus (RANSAC) technique is employed by module 940. In general, the RANSAC procedure iteratively estimates parameters of a mathematical model from a set of observed data—e.g., mappings from putative pairs of features, such as histogram features 1131 and 1132 in FIG. 11 when those mapping include outliers that are assumed to be data points that lie outside the model itself, resulting from, for example, erroneous measurements, extreme noise values, or the like.

In various embodiments, module 940 uses the RANSAC procedure to randomly sample the observed data (e.g., feature correlations) and uses a "voting scheme" to find the optimal fitting result. Data points effectively vote for one or more models, and assume that noisy features will not consistently vote for any particular model. A subset containing feature mappings is randomly selected from the input dataset, and a first mathematical model is then determined using that subset of data points. Next, a determination is made as to which elements of the entire dataset are consistent with the first mathematical model (i.e., the "consensus set"). A data point will be considered an outlier if it does not fit the first model within some error threshold corresponding, for example, to the maximum deviation that can be attributed to the effect of noise. The foregoing is repeated iteratively until the consensus set meets certain criteria, such as a minimum number of consensus data points.

It will be understood that various embodiments of the localization system 100 according to the present disclosure may include any number of sub-modules embedded within the controller 34 which may be combined and/or further partitioned to similarly implement systems and methods described herein. Furthermore, inputs to the localization system 100 may be received from the sensor system 28, received from other control modules (not shown) associated with the autonomous vehicle 10, received from the communication system 36, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like.

Furthermore, the various modules described above may be implemented as one or more machine learning models that undergo supervised, unsupervised, semi-supervised, or reinforcement learning and perform classification (e.g., binary or multiclass classification), regression, clustering, dimensionality reduction, and/or such tasks. Examples of such models include, without limitation, artificial neural networks (ANN) (such as a recurrent neural networks (RNN) and convolutional neural network (CNN)), decision tree models (such as classification and regression trees (CART)), ensemble learning models (such as boosting, bootstrapped aggregation, gradient boosting machines, and random forests), Bayesian network models (e.g., naive Bayes), principal component analysis (PCA), support vector machines (SVM), clustering models (such as K-nearest-neighbor, K-means, expectation maximization, hierarchical clustering, etc.), and the like.

In some embodiments, training of the model (i.e., 930, 940 and/or 1020) occurs within a system remote from vehicle 10 (e.g., system 52 in FIG. 2) and is subsequently downloaded to vehicle 10 for use during normal operation of vehicle 10. In other embodiments, training occurs at least in part within controller 34 of vehicle 10, itself, and the model is subsequently shared with external systems and/or other vehicles in a fleet (such as depicted in FIG. 2). Training data may similarly be generated by vehicle 10 or acquired externally, and may be partitioned into training sets, validation sets, and test sets prior to training.

Figure 12:
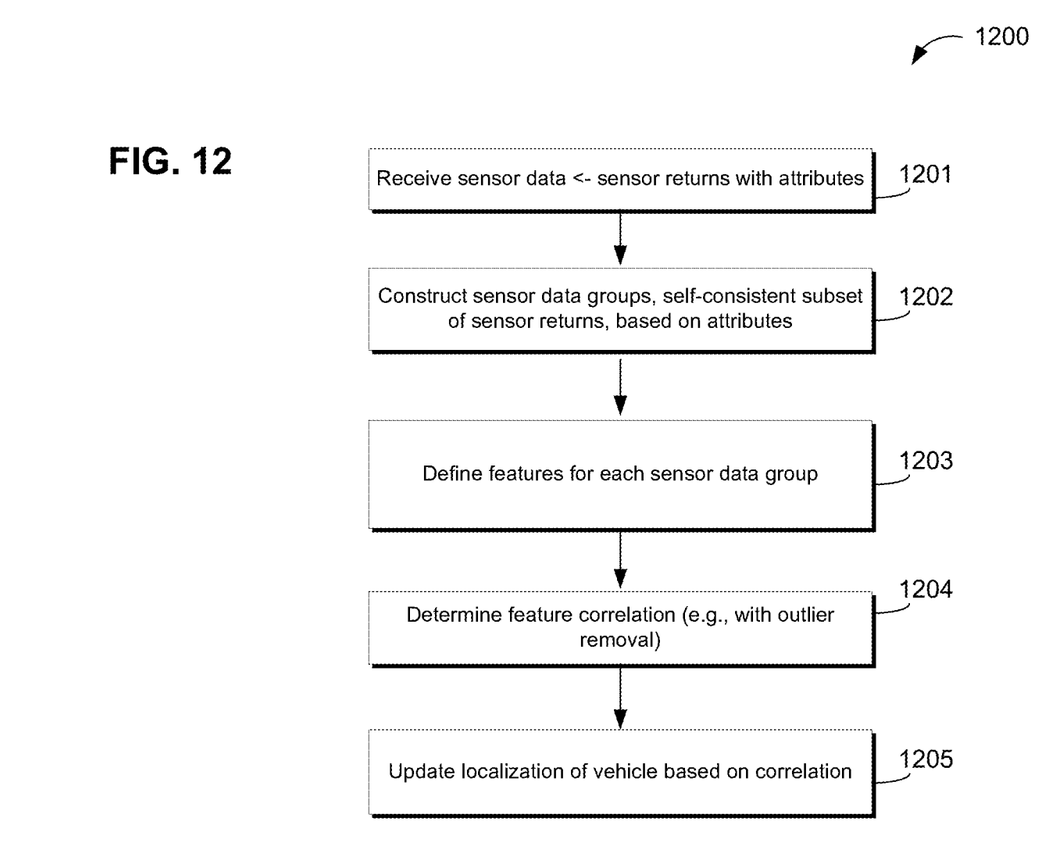
FIG. 12 is a flowchart illustrating a control method for controlling the autonomous vehicle, in accordance with various embodiments.

Referring now to FIG. 12, and with continued reference to FIGS. 1-11, the illustrated flowchart provides a control method 1200 that can be performed by localization system 100 in accordance with the present disclosure. As can be appreciated in light of the disclosure, the order of operation within the method is not limited to the sequential execution as illustrated in the figure, but may be performed in one or more varying orders as applicable and in accordance with the present disclosure. In various embodiments, the method can be scheduled to run based on one or more predetermined events, and/or can run continuously during operation of autonomous vehicle 10.

In various embodiments, the method begins at 1201 in which AV 10 receives sensor data in the form of, for example, sensor returns having a number of corresponding attributes (as shown in FIG. 6). As mentioned above, the particular attributes may vary depending upon the nature of the sensor data.

Next, at 1202, sensor data groups are constructed to contain self-consistent subsets of the sensor returns (based on their attributes). These sensor data groups and their respective sensor returns may be partitioned into a spatial grid in the vicinity of AV 10, as depicted in FIG. 7.

At 1203, features are determined for each sensor data group, as shown in FIG. 8. The features might correspond, for example, to summary statistics of one or more attributes and/or a histogram or other visualization of one or more attributes. These features are effectively "placed" at a location relative to AV 10 (e.g., by virtue of their corresponding grid cell, as shown in FIG. 8).

Next, as 1204, a correlation between features is determined at subsequent time steps. That is, a mapping is produced between the current set of placed features and a previously determined set of placed features (e.g., a set of placed features from the previous time step). To facilitate this correlation, an outlier removal technique may be employed, such as a RANSAC procedure. In some embodiments, only stationary features (e.g., road signs, poles, etc.) are considered in determining this correlation.

Finally, at 1205, the localization of AV 10 is updated based on the correlation determined at 1204. That is, the estimated movement and change of pose of AV 10 during a time step is provided to positioning system 76 (FIG. 3) to assist in determining the absolute position of AV in its environment.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A localization method comprising:
    receiving sensor data relating to an environment of a vehicle, the sensor data including a plurality of sensor returns associated with objects in the environment, each of the sensor returns having a plurality of corresponding attributes;

constructing a first plurality of sensor data groups, each including a self-consistent subset of the plurality of sensor returns based on a machine learning clustering method and their corresponding attributes;

defining, for each of the first plurality of sensor data groups, a first set of features, wherein the first set of features includes a histogram associated with each of the corresponding attributes, and wherein each group has an associated feature location;

determining, with a processor, a feature correlation between the first set of features and a second, previously determined set of features based on the histograms and the feature location; and estimating a position of the vehicle based on the feature correlation.

2. The method of claim 1, wherein the plurality of corresponding attributes includes at least one of Doppler shift, return power, and neighborhood similarity.

3. The method of claim 1, wherein the sensor data includes at least radar data.

4. The method of claim 1, wherein the first set of features includes a convex hull of the histogram.

5. The method of claim 1, wherein the first set of features includes a summary statistic of one of the corresponding attributes.

6. The method of claim 1, wherein determining the feature correlation includes performing an outlier removal procedure with respect to the first and second sets of features.

7. The method of claim 6, wherein the outlier removal procedure is a random sample consensus (RANSAC) procedure.

8. The method of claim 1, further including classifying each of the sensor data groups as being associated with one of a dynamic object, a static-moveable object, and a static-nonmoveable object, and determining the feature correlation based only on the sensor data groups associated with static-nonmoveable objects.

9. A system for controlling a vehicle, comprising:
a feature determination module, including a processor, configured to: receive sensor data relating to an environment of a vehicle, the sensor data including a plurality of sensor returns associated with objects in the environment, each of the sensor returns having a plurality of corresponding attributes; construct a first plurality of sensor data groups, each including a self-consistent subset of the plurality of sensor returns based on a machine learning clustering method and their corresponding attributes; and define, for each of the first plurality of sensor data groups, a first set of features, the first set of features includes a histogram associated with each of the corresponding attributes, and wherein each group has an associated feature location; and
a feature correlation module configured to determine, with a processor, a feature correlation between the first set of features and a second, previously determined set of features based on the histograms and the feature location.

10. The system of claim 9, wherein:
the plurality of corresponding attributes includes at least one of Doppler shift, return power, and neighborhood similarity; and
the sensor data is at least one of radar data and lidar data.

11. The system of claim 9, wherein the first set of features includes a summary statistic of one of the corresponding attributes.

12. The system of claim 9, wherein the feature correlation module performs an outlier removal procedure with respect to the first and second sets of features.

13. The system of claim 12, wherein the outlier removal procedure is a random sample consensus (RANSAC) procedure.

14. The system of claim 9, wherein the feature determination module classifies each of the sensor data groups as being associated with one of a dynamic object, a static-moveable object, and a static-nonmoveable object, and the feature correlation module determines the feature correlation based only on the sensor data groups associated with static-nonmoveable objects.

15. An autonomous vehicle, comprising:
at least one sensor that provides sensor data relating to an environment of the autonomous vehicle, the sensor data including a plurality of sensor returns associated with objects in the environment, each of the sensor returns having a plurality of corresponding attributes; and
a controller that, by a processor:
receives the sensor data;
constructs a first plurality of sensor data groups, each including a self-consistent subset of the plurality of sensor returns based on a machine learning clustering method and their corresponding attributes;
defines, for each of the first plurality of sensor data groups, a first set of features, wherein the first set of features includes a histogram associated with each of the corresponding attributes, and wherein each group has an associated feature location;
determines, with a processor, a feature correlation between the first set of features and a second, previously determined set of features based on the histograms and the feature location; and
estimates a position of the vehicle based on the feature correlation.

16. The autonomous vehicle of claim 15, wherein the controller performs outlier removal via a random sample consensus (RANSAC) procedure to determine the feature correlation.

17. The autonomous vehicle of claim 15, wherein
the plurality of corresponding attributes includes at least one of Doppler shift, return power, and neighborhood similarity; and
the sensor data includes radar data.

* * * * *